(12) United States Patent
Chang et al.

(10) Patent No.: US 10,384,087 B2
(45) Date of Patent: Aug. 20, 2019

(54) MANAGEMENT SERVER FOR MANAGING MAINTENANCE OF FIRE EXTINGUISHERS AND EXTINGUISHER MANAGEMENT SYSTEM INCLUDING THE SAME

(71) Applicant: Kuo-Chi Chang, New Taipei (TW)

(72) Inventors: Kuo-Chi Chang, New Taipei (TW); Hsiao-Chuan Wang, New Taipei (TW); Kai-Chun Chu, Taoyuan (TW); Tsui-Lien Hsu, New Taipei (TW)

(73) Assignee: Kuo-Chi Chang, New Taipei (TW)

( * ) Notice: Subject to any disclaimer, the term of this patent is extended or adjusted under 35 U.S.C. 154(b) by 322 days.

(21) Appl. No.: 15/587,665

(22) Filed: May 5, 2017

(65) Prior Publication Data

US 2018/0318619 A1   Nov. 8, 2018

(51) Int. Cl.
| | |
|---|---|
| *G08B 21/00* | (2006.01) |
| *A62C 13/76* | (2006.01) |
| *A62C 37/50* | (2006.01) |
| *H04W 84/10* | (2009.01) |

(52) U.S. Cl.
CPC .............. *A62C 13/76* (2013.01); *A62C 37/50* (2013.01); *H04W 84/10* (2013.01)

(58) Field of Classification Search
CPC ......... A62C 13/76; A62C 13/62; A62C 37/50; H04W 84/10; G08B 19/00

USPC .... 340/611, 612, 614, 626, 531; 169/75, 56, 169/23
See application file for complete search history.

(56) References Cited

U.S. PATENT DOCUMENTS

| | | | | |
|---|---|---|---|---|
| 7,081,815 | B2 * | 7/2006 | Runyon | E05G 1/10 169/51 |
| 7,174,769 | B2 * | 2/2007 | McSheffrey, Jr. | G08B 25/10 169/75 |
| 7,450,020 | B2 * | 11/2008 | McSheffrey | A61N 1/39 169/23 |
| 7,728,715 | B2 * | 6/2010 | Riedel | A61N 1/39 340/286.05 |
| 8,210,047 | B2 * | 7/2012 | McSheffrey, Jr. | A62C 37/50 73/700 |

* cited by examiner

*Primary Examiner* — Toan N Pham
(74) *Attorney, Agent, or Firm* — McClure, Qualey & Rodack, LLP

(57) ABSTRACT

An extinguisher management system includes a fire extinguisher, a management server and a maintenance server. The fire extinguisher transmits a notification signal when a measured pressure thereof is beyond a predetermined pressure range. The management server includes a wireless receiver for receiving the notification signal from the fire extinguisher, and a database storing an apparatus data set corresponding to the fire extinguisher. The management server outputs an apparatus information in the apparatus data set in response to receipt of the notification signal. The maintenance server is configured to update a to-be-maintained list according to the apparatus information received from the management server.

11 Claims, 2 Drawing Sheets

MANAGEMENT SERVER FOR MANAGING MAINTENANCE OF FIRE EXTINGUISHERS AND EXTINGUISHER MANAGEMENT SYSTEM INCLUDING THE SAME

FIELD

The disclosure relates to a management server for managing maintenance of fire extinguishers, and an extinguisher management system including the same.

BACKGROUND

Generally, a fire extinguisher is provided with a pressure gauge and a pressure indicator, and an inspector has to check the pressure indicator for confirming whether the fire extinguisher is normal. A building usually has a lot of fire extinguishers usually placed at multiple locations, and the fire extinguishers should be inspected periodically to ensure that they can function normally. Therefore, the inspector needs to directly check the pressure indicators of the extinguishers one by one by going through all the locations where the fire extinguishers are placed, and this may consume a lot of manpower.

SUMMARY

Therefore, an object of the disclosure is to provide an extinguisher management system that can alleviate the drawback of the prior art.

According to the disclosure, the extinguisher management system includes at least one fire extinguisher, a management server and at least one maintenance server.

The at least one fire extinguisher each includes a canister for containing a fire extinguishing agent, a pressure gauge disposed on the canister for measuring a pressure therein, and a wireless transmitter coupled to the pressure gauge and configured to transmit a notification signal when the pressure measured by the pressure gauge is beyond a predetermined pressure range.

The management server includes a wireless receiver, a management database controller and a first communication module. The wireless receiver is configured to communicate wirelessly with the wireless transmitter for receiving the notification signal therefrom. The management database controller is electrically connected to the wireless receiver, and includes an apparatus database storing an apparatus data set. The apparatus data set corresponds to the at least one fire extinguisher, and includes apparatus information related to the at least one fire extinguisher. The first communication module is electrically connected to the management database controller and configured to access a network. The management server is configured to output the apparatus information through the first communication module in response to receipt of the notification signal.

The at least one maintenance server corresponds to the at least one fire extinguisher, and each includes a second communication module and a maintenance controller. The second communication module is configured to access the network for receiving the apparatus information related to the at least one fire extinguisher from the first communication module. The maintenance controller is electrically connected to the second communication module for receiving the apparatus information, and includes a to-be-maintained list. The maintenance controller is configured to update the to-be-maintained list according to the apparatus information.

Another object of the disclosure is to provide a management server that can alleviate the drawback of the prior art.

According to the disclosure, the management server is for managing maintenance of a fire extinguisher, and includes a wireless receiver, a management database controller and a communication module.

The wireless receiver is configured to communicate wirelessly with the fire extinguisher for receiving a notification signal therefrom. The fire extinguisher transmits the notification signal when a pressure therein is beyond a predetermined pressure range.

The management database controller is electrically connected to the wireless receiver, and includes an apparatus database that stores an apparatus data set. The apparatus data set corresponds to the fire extinguisher, and includes apparatus information related to the fire extinguisher.

The communication module is electrically connected to the management database controller, and is configured to access a network. In response to receipt of the notification signal, the management server is configured to output the apparatus information through the first communication module to a maintenance server such that the maintenance server updates a to-be-maintained list stored therein according to the apparatus information.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
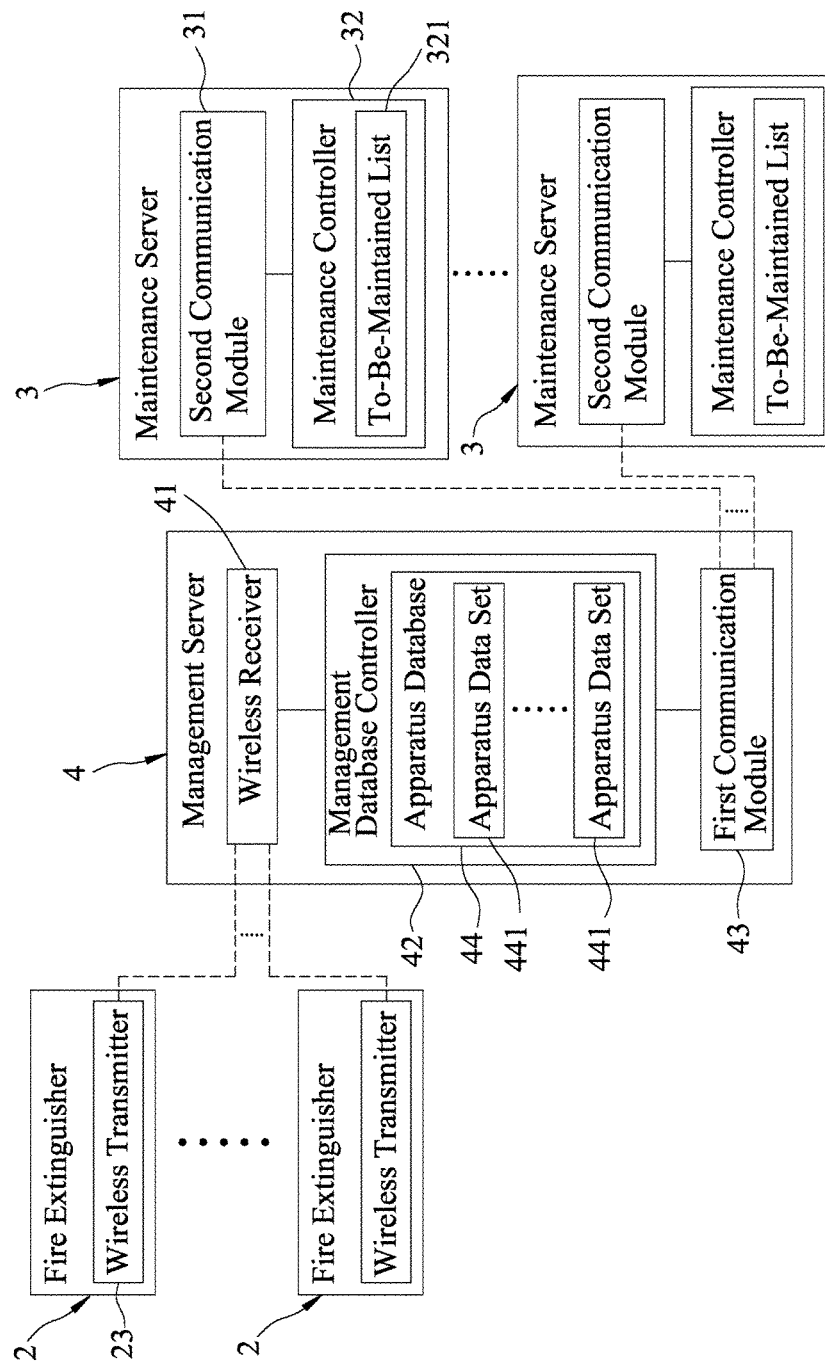
FIG. 1 is a block diagram illustrating an exemplary embodiment of an extinguisher management system according to this disclosure.
Figure 2:
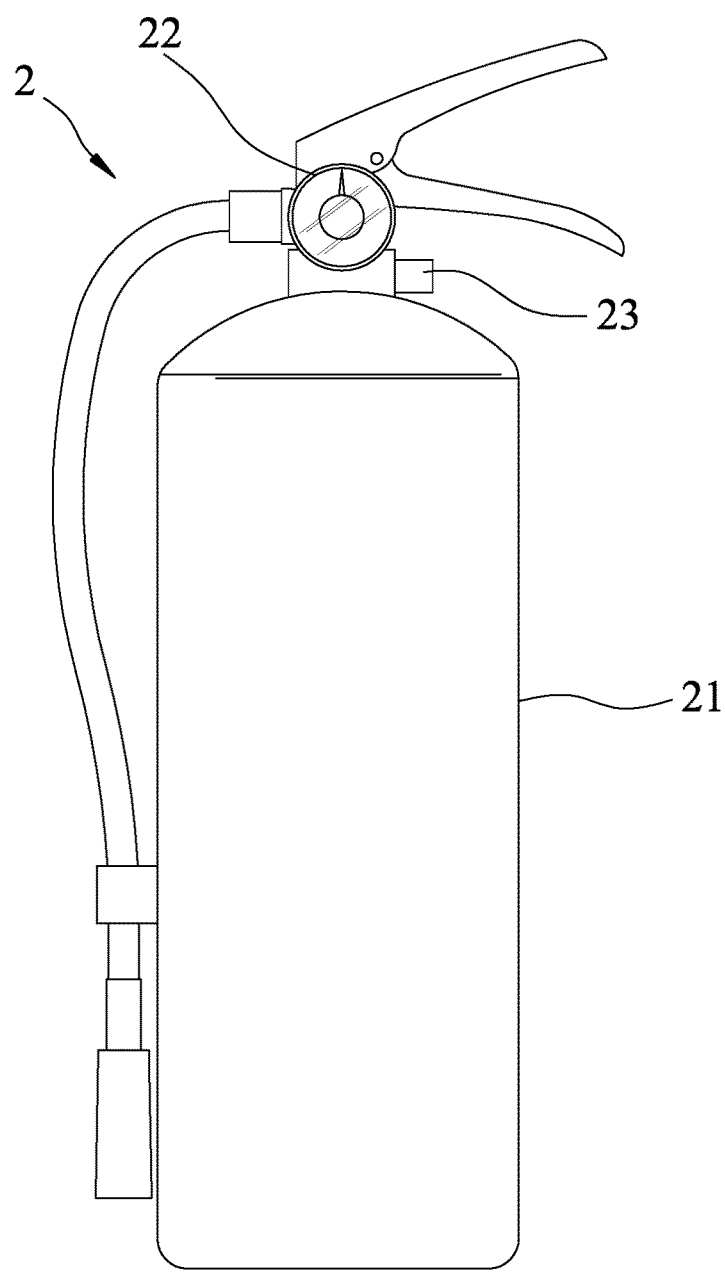
FIG. 2 is a schematic view of a fire extinguisher of the extinguisher management system according to the exemplary embodiment.

Referring to FIGS. 1 and 2, an exemplary embodiment of an extinguisher management system is shown. The extinguisher management system includes a plurality of fire extinguishers 2, a management server 4 and a plurality of maintenance servers 3. It should be noted that the extinguisher management system may include only one fire extinguisher 2 and one maintenance server 3 in another embodiment.

Each of the fire extinguishers 2 includes a canister 21, a pressure gauge 22 and a wireless transmitter 23. In this embodiment, each fire extinguisher 2 may be, but not limited to, a conventional fire extinguishers (e.g., a wheeled fire extinguisher). For example, the fire extinguishers 2 are placed at respective locations in a building.

The canister 21 is for containing a fire extinguishing agent. The fire extinguishing agent in the canister 21 maybe a powder agent, a chemical agent, a carbon-dioxide agent, etc. The pressure gauge 22 is disposed on the canister 21 for measuring a pressure therein.

The wireless transmitter 23 is coupled to the pressure gauge 22, and is configured to transmit a notification signal when the pressure measured by the pressure gauge is beyond a predetermined pressure range. More particularly, the notification signal contains an identification (ID) code of the fire extinguisher 2 which includes the wireless transmitter 23 is included in. Furthermore, the wireless transmitter 23 is configured to transmit the notification signal indicating that the pressure in the canister 21 is abnormally high when the pressure measured by the pressure gauge 22 is higher than an upper limit of the predetermined pressure range. Similarly, the wireless transmitter 23 is configured to transmit the notification signal indicating that the pressure in the canister 21 is abnormally low when the pressure measured by the pressure gauge 22 is lower than a lower limit of the predetermined pressure range. For example, the wireless transmitter 23 maybe implemented by using an antenna (e.g., a Bluetooth antenna, a WiFi antenna, and or the like) and a microprocessor, and may be powered by a rechargeable battery or a non-rechargeable battery. It should be noted that the wireless transmitter 23 is not limited to the example described above.

Referring to FIG. 1, the management server 4 includes a wireless receiver 41, a management database controller 42 and a first communication module 43.

The wireless receiver 41 is configured to communicate wirelessly with the wireless transmitter 23 for receiving the notification signal therefrom. The management database controller 42 is electrically connected to the wireless receiver 41, and includes an apparatus database 44 storing a plurality of apparatus data sets 441. The apparatus data sets 441 correspond to the fire extinguishers 2, respectively. Each of the apparatus data sets 441 includes apparatus information and a network address. The apparatus information includes the ID code and a physical location of the corresponding one of the fire extinguishers 2. The network address is directed to one of the maintenance servers 3. The first communication module 43 is electrically connected to the management database controller 42 and is configured to access a network.

For example, the management server 4 is a local server placed in the building where the fire extinguishers 2 are placed, the wireless receiver 41 is an antenna (e.g., a Bluetooth antenna, a WiFi antenna, or the like) compatible with the wireless transmitters 23 of the fire extinguishers 2, the management database controller 42 includes a processor and a tangible storage device (e.g., a hard disk drive), and the first communication module 43 is a network interface controller (e.g., a network card).

In response to receipt of the notification signal from one of the fire extinguishers 2 through the wireless receiver 41, the management database controller 42 fetches from the apparatus database 44 one of the apparatus data sets 441 that includes the apparatus information with the ID code matching the ID code contained in the notification signal, and outputs the apparatus information of the apparatus data set 441 fetched thereby to one of the maintenance server 3 through the first communication module 43 according to the network address included in the apparatus data set 441 fetched thereby. In some embodiments, the management database controller 42 is further configured to output a condition code along with the apparatus information to the one of the maintenance servers 3 through the first communication module 43. The condition code is generated by the management database controller 42 according to the notification signal indicating that the pressure in the canister 21 is abnormally high or low. In this embodiment, for example, a code "1" may represent that the pressure is abnormally high, and a code "2" may represent that the pressure is abnormally low. It should be noted that the condition code is not limited to the examples described above.

The maintenance servers 3 each include a second communication module 31 and a maintenance controller 32. Each of the maintenance servers 3 corresponds to a respective group of the fire extinguishers 2. The respective group of the fire extinguishers 2 may be configured on user demand. In one embodiment, the fire extinguishers 2 that are inspected and maintained periodically by the same fire protection solution provider belong to one group, which corresponds to a respective one of the maintenance servers 3. In one embodiment, the fire extinguishers 2 containing the same fire extinguishing agent belong to one group, which corresponds to a respective one of the maintenance servers 3.

The second communication module 31 is configured to access the network for receiving the apparatus information and the condition code from the first communication module 43. For example, the second communication module 31 is, but not limited to, a network interface controller.

The maintenance controller 32 is electrically connected to the second communication module 31 for receiving the apparatus information and the condition code, and stores a to-be-maintained list 321 corresponding to the respective group of the fire extinguishers 2. The to-be-maintained list 321 includes, for example, the apparatus information (i.e., the ID code and the physical location) and a to-be-maintained item of each abnormal fire extinguisher. The to-be-maintained item indicates one of that the pressure in the abnormal fire extinguisher is abnormally low and the abnormal fire extinguisher requires boosting pressure and that the pressure in the abnormal fire extinguisher is abnormally high and the abnormal fire extinguisher requires discharging pressure. The maintenance controller 32 is configured to update the to-be-maintained list 321 according to the apparatus information and the condition code received from the second communication module 31, by adding the apparatus information and the to-be-maintained item, which is determined based on the condition code, to the to-be-maintained list 321. For example, the maintenance controller 32 includes a processor and a tangible storage device (e.g., a hard disk drive).

In use, when the pressure in the canister 21 of one of the fire extinguishers 2 is beyond the predetermined pressure range (i.e., said one of the fire extinguishers 2 is an abnormal fire extinguisher 2), the wireless transmitter 23 of the abnormal fire extinguisher 2 transmits the notification signal to the management server 4. The management database controller 42 of the management server 4 then receives the notification signal through the wireless receiver 41. In response to the receipt of the notification signal, the management database controller 42 compares the ID code contained in the notification signal with the ID codes included in the apparatus data sets 441, and fetches a matched one of the apparatus data sets 441 that has the ID code matching with the ID code in the notification signal, generates the condition code according to the notification signal, and sends both the apparatus information included in the matched one of the apparatus data sets 441 and the condition code to the corresponding one of the maintenance servers 3 according to the network address included in the matched one of the apparatus data sets 441. The corresponding maintenance server 3, in response to receipt of the apparatus information and the condition code from the management server 4, adds the apparatus information and the to-be-maintained item that corresponds to the condition code into the to-be-maintained list 321. The maintenance server 3 may include a display device to display the to-be-maintained list 321. In addition, the maintenance server 3 may be operated by the fire protection solutions provider that is in charge of the maintenance of the respective group of the fire extinguishers 2. Therefore, the fire protection solutions provider can be notified instantly of which fire extinguisher 2 should be maintained or replaced according to the to-be-maintained list 321, and can dispatch an inspector to the physical location of the abnormal fire extinguisher 2 for maintaining the same.

In sum, the extinguisher management system according to this disclosure can instantly update the corresponding to-be-maintained list 321 when any of the fire extinguishers 2 of the extinguisher management system is abnormal and needs to be maintained or replaced. Therefore, the fire protection solutions provider can be notified, by the maintenance server 3 displaying the to-be-maintained list 321, of the presence of any abnormal fire extinguisher 2 which the fire protection solutions provider is responsible for, perform timely maintenance/repair/replacement, and ensure that all the fire extinguishers 2 function normally. In addition, manpower and time consumption may also be reduced by using the extinguisher management system according to this disclosure since there is no need to send an inspector to inspect the fire extinguishers 2 one by one.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An extinguisher management system comprising:
   at least one fire extinguisher each including a canister for containing a fire extinguishing agent, a pressure gauge disposed on said canister for measuring a pressure therein, and a wireless transmitter coupled to said pressure gauge and configured to transmit a notification signal when the pressure measured by said pressure gauge is beyond a predetermined pressure range;
   a management server including
   a wireless receiver configured to communicate wirelessly with said wireless transmitter for receiving the notification signal therefrom,
   a management database controller electrically connected to said wireless receiver, and including an apparatus database that stores an apparatus data set, the apparatus data set corresponding to said at least one fire extinguisher and including apparatus information related to said at least one fire extinguisher, and
   a first communication module electrically connected to said management database controller and configured to access a network,
   wherein said management server is configured to output the apparatus information through said first communication module in response to receipt of the notification signal; and
   at least one maintenance server corresponding to said at least one fire extinguisher, each of said at least one maintenance server including
   a second communication module configured to access the network for receiving the apparatus information related to said at least one fire extinguisher from said first communication module, and
   a maintenance controller electrically connected to said second communication module for receiving the apparatus information, storing a to-be-maintained list, and configured to update the to-be-maintained list according to the apparatus information.

2. The extinguisher management system of claim 1, wherein said at least one fire extinguisher includes a plurality of fire extinguishers, and said apparatus database stores a plurality of apparatus data sets corresponding to said fire extinguishers, respectively,
   wherein said at least one maintenance server includes a plurality of maintenance servers each corresponding to a respective group of said fire extinguishers, and each including said maintenance controller that stores the to-be-maintained list to correspond to the respective group of said fire extinguishers.

3. The extinguisher management system of claim 1, wherein the apparatus information of the apparatus data set includes an identification (ID) code and a physical location of said at least one fire extinguisher, and the apparatus data set further includes a network address of said at least one maintenance server.

4. The extinguisher management system of claim 3, wherein said wireless transmitter is configured to transmit the notification signal to contain the ID code of said at least one fire extinguisher,
   wherein said management database controller is configured to
   fetch from the apparatus database the apparatus data set that includes the apparatus information with the ID code matching the ID code contained in the notification signal received from said wireless transmitter through said wireless receiver, and
   output the apparatus information of the apparatus data set fetched thereby to said at least one maintenance server according to the network address included in the apparatus data set fetched thereby.

5. The extinguisher management system of claim 4, wherein said maintenance database controller is configured to update the to-be-maintained list by adding the apparatus information to the to-be-maintained list.

6. The extinguisher management system of claim 1, wherein said wireless transmitter is configured to transmit the notification signal indicating that the pressure in said canister is abnormally high when the pressure measured by said pressure gauge is higher than an upper limit of the predetermined pressure range.

7. The extinguisher management system of claim 1, wherein said wireless transmitter is configured to transmit the notification signal indicating that the pressure in said canister is abnormally low when the pressure measured by said pressure gauge is lower than a lower limit of the predetermined pressure range.

8. A management server for managing maintenance of a fire extinguisher, said management server comprising:

a wireless receiver configured to communicate wirelessly with the fire extinguisher for receiving a notification signal therefrom, the fire extinguisher transmitting the notification signal when a pressure therein is beyond a predetermined pressure range;

a management database controller electrically connected to said wireless receiver, and including an apparatus database that stores an apparatus data set, the apparatus data set corresponding to the fire extinguisher and including apparatus information related to the fire extinguisher; and a communication module electrically connected to said management database controller and configured to access a network, wherein, in response to receipt of the notification signal, said management server is configured to output the apparatus information through said first communication module to a maintenance server such that the maintenance server updates a to-be-maintained list stored therein according to the apparatus information.

9. The management server of claim 8, said management server being for managing maintenance of a plurality of fire extinguishers, wherein said apparatus database stores a plurality of apparatus data sets corresponding to the fire extinguishers, respectively.

10. The management server of claim 8, wherein the apparatus information of the apparatus data set includes an identification (ID) code and a physical location of the fire extinguisher, and the apparatus data set further includes a network address of the maintenance server.

11. The management server of claim 10, the notification signal containing the ID code of the fire extinguisher, wherein said management database controller is configured to:

fetch from the apparatus database the apparatus data set that includes the apparatus information with the ID code matching the ID code contained in the notification signal received from the fire extinguisher through said wireless receiver; and output the apparatus information of the apparatus data set fetched thereby to the maintenance server according to the network address included in the apparatus data set fetched thereby.

* * * * *